United States Patent [19]

Kurosaki

[11] Patent Number: 6,017,575
[45] Date of Patent: Jan. 25, 2000

[54] DRY FOOD PRODUCT OF FERMENTED SOYBEANS

[75] Inventor: Shin-ya Kurosaki, Tochigi, Japan

[73] Assignee: Azuma Co., Ltd., Tochigi, Japan

[21] Appl. No.: 09/141,108

[22] Filed: Aug. 27, 1998

[30] Foreign Application Priority Data

Jul. 16, 1998 [JP] Japan ..................... 10-218566

[51] Int. Cl.$^7$ ................. A23L 1/20; A23L 1/00
[52] U.S. Cl. .............. 426/634; 426/46; 426/438
[58] Field of Search ..................... 426/634, 438, 426/46

[56] References Cited

PUBLICATIONS

Patent Abstracts of Japan for Application No. 05–152536. Abstract published Nov. 21, 1995. Inventor: Ota.

Patent Abstracts of Japan for Application No. 02–232714. Grp No: C0970, vol. 16, No. 358. Inventor: Kuroiwa, Aug. 1992.

*Primary Examiner*—Anthony J. Weier
*Attorney, Agent, or Firm*—Sughrue, Mion, Zinn, Macpeak & Seas, PLLC

[57] ABSTRACT

A dry food product of fermented soybeans, which is prepared by frying fermented soybeans in an oil and removing skins, and which has an average *Bacillus natto* survival ratio of $1.0 \times 10^8$ to $7.0 \times 10^8$ microorganisms/g when 10 g thereof is milled and measured by an agar plate culture method, the dry food product being almost free of an odor characteristic of fermented soybeans, being storable for a long period of time with maintaining a commercial value and being suitable for being had like cookies.

4 Claims, No Drawings

DRY FOOD PRODUCT OF FERMENTED SOYBEANS

FIELD OF THE INVENTION

The present invention relates to a dry food product of fermented soybeans.

PRIOR ART

Fermented soybeans called "natto" in the Japanese language are a food product prepared by inoculating *Bacillus natto*, a kind of *Bacillus subtilis*, in soybeans and propagating the *Bacillus natto* at a proper temperature for a certain period of time. Fermented soybeans contain a large amount of minerals and vitamin B in addition to protein, lipid, sugar, etc., and there is a commercially high demand therefor as a health food. *Bacillus natto* is a surface bacterium, and the flavor and sapidity inherent to fermented soybeans are mostly from characteristically sticky circumferential portions which *Bacillus natto* has got into. These portions are called mucin and made of a mixture containing glutamic acid polypeptide (amino acid) combined by peptide bond and fructan (fruit sugar). It is said that the tastiness increases with an increase in the threads-forming stickiness degree of mucin.

However, when mucin forms long sticky threads, tie sticky threads may adhere to clothes at a meal time or stick to lips and their surroundings to give unpleasantness after the meal. Further, there are many people who do not like fermented soybeans without even having tried them due to their threads-formation activity and their characteristic odor. Dry fermented soybeans of which the threads-formation activity is removed by drying them are therefore thinkable. As a method therefor, there have been employed means of drying it in the sun, means of drying it with hot air or a freeze-drying method.

Since, however, fermented soybeans are a fermented food product, they come to generate an ammoniacal odor in a short period of time if they are maintained in a high-temperature state for their drying in the sun or with hot air. And, their commercial value may be reduced by half, and the taste, flavor and sapidity characteristic of fermented soybeans are lost.

Dry fermented soybeans prepared by a freeze-drying method do not generate the above ammoniacal odor, while they retain the odor (flavor) inherently characteristic of fermented soybeans. Further, when these dry products of fermented soybeans are handled, for example, packaged or transported, skins are separated from their seeds and scattered in packages or set in bottoms of bottles to decrease the commercial value thereof. Further, conventional dry products of fermented soybeans have a feature that they resume their sticking nature and threads-formation activity by reacting with water contained in cooked rice, to give the flavor characteristic of fermented soybeans. For this reason, they are sticky when touched by fingers, and they are in a raw state, so that they are not proper for being had like cookies.

The present invention has been made in view of the above circumstances, and its object is to provide a dry food product of fermented soybeans which is almost free of the odor characteristic of fermented soybeans, which can be stored for a long period of time with maintaining its commercial value and which is proper for being had like cookies.

SUMMARY OF THE INVENTION

According to the present invention, the above object of the present invention is achieved by any one of the following constitutions.

(1) A dry food product of fermented soybeans, which is prepared by frying fermented soybeans in an oil and removing skins, and which has an average *Bacillus natto* survival ratio of $1.0 \times 10^8$ to $7.0 \times 10^8$ microorganisms/g when 10 g thereof is milled and measured by an agar plate culture method.

(2) In the above dry food product of fermented soybeans (1), the dry food product has a water content of 2 to 7% by weight.

(3) In the above dry food product of fermented soybeans (1) or (2), the dry food product has a lipid content of 20 to 32% by weight.

(4) In the above dry food product of fermented sovbeans (1), (2) or (3), the dry food product is obtained by freezing fermented soybeans at −5 to −30° C. before frying them, and then frying the fermented soybeans in a frozen state in an oil under a reduced pressure of 5 to 40 Torr at a temperature of 105 to 125° C. for 15 to 35 minutes.

DETAILED DESCRIPTION OF THE INVENTION

The dry food product of fermented soybeans, provided by the present invention, is a product prepared by frying fermented soybeans under reduced pressure at a low temperature for a sufficient period of time, then removing an oil and separating outer skins from seeds.

In the present invention, fermented soybeans are fried at a low temperature for a sufficient period of time, so that the fermented soybeans are completely fried up to cores of seeds, and therefore, the fried fermented soybeans are uniform in feeling thereof on the tongue and aromatic. Since they are fried, the sticky nature on the surface is controlled, and they are proper for being had like cookies by picking them up with fingers. Further, since the odor characteristic of fermented soybeans is prevented, they can be served to people who dislike fermented soybeans due to their odor.

Further, since the dry food product of fermented soybeans, provided by the present invention, is a product prepared by frying fermented soybeans in an oil, not only the energy per unit weight increases, but also the dry food is improved in the contents of calcium, protein, lipid, sugar and carbohydrate per unit weight, which contents are more than about twice as much as those in fermented soybeans in a raw state.

JP-B-6-22466 (of which the assignee has been changed to the present Applicant) proposes a food product of fermented soybeans in a title similar to the title of the present invention. However, the food product of fermented soybeans, proposed in the above Japanese patent publication, is directed to outer layer portions of fermented soybeans, and seed portions of the fermented soybeans are removed. It can be therefore said that almost nothing has been studied concerning the seed portions of fermented soybeans. The above Japanese patent publication therefore discloses substantially nothing concerning the condition of preparing fermented soybeans of which seeds are to be had and which are fried in an oil.

The dry food product of fermented soybeans, provided by the present invention, is a product prepared by frying fermented soybeans in an oil and removing skins thereof. When 10 g of the above product is milled and measured by an agar plate culture method, it shows an average *Bacillus natto* survival ratio of $1.0 \times 10^8$ to $7.0 \times 10^8$ microorganisms/g. In this connection, fermented soybeans in a raw state show an average *Bacillus natto* survival ratio of about $1.0 \times 10^9$ microorganisms/g.

The dry food product of fermented soybeans, provided by the present invention, preferably has a water content of 2 to 7% by weight. When the above water content is less than 2% by weight, the fermented soybeans are overheated and partially or totally burned to cause bitterness. Further the preparation takes too long a time. When it exceeds 7% by weight, the problem is that the characteristic crisp taste and feeling on the tongue are lost. Namely, the fermented soybeans in a raw state have a water content of about 60% by weight.

The dry food product of fermented soybeans, provided by the present invention, has a lipid content (lipid derived from soybeans+residual oil from the frying) of approximately 20 to 32% by weight, and the weight of the dry food product of fermented soybeans is about one third of the weight of fermented soybeans in a raw state.

Further, in the dry food product of fermented soybeans, provided by the present invention, not only the energy per unit weight increases, but also the contents of calcium, protein, lipid, sugar and carbohydrate per unit weight, are more than about twice as much as those in fermented soybeans in a raw state.

The process for preparing the dry food of fermented soybeans, provided by the present invention, will be explained hereinafter.

First, produced fermented soybeans in a raw state are frozen. The freezing is carried out at a temperature of −5 to −30° C., preferably −10 to −20° C., for approximately 24 to 48 hours. As a result, the fermented soybeans are brought into a state where even water therein is frozen, and the frozen water portion is removed by evaporation in a subsequent frying step, whereby the fermented soybeans are made porous to give the characteristically crisp taste and feeling on the tongue. When the freezing time exceeds 48 hours, a freezer burn is liable to take place, and the taste and feeling tend to become poor.

When fermented soybeans are frozen as described above, preferably, they are frozen in the form of a plate-like mass having a weight of approximately 1 to 20 kg, preferably approximately 5 to 12 kg. When the plate-like frozen mass is too large in size, preferably, grooves or cutting lines for easily dividing it into small pieces are provided. The above grooves or cutting lines can be provided by pressing a mass of fermented soybeans with a patterning frame before they are frozen.

The above plate-like frozen mass of fermented soybeans is fried while it is in a frozen state. The frying is carried out in a pressure-reducible cooker. The cooker contains a predetermined amount of an oil while retaining a space having a considerable height above. In the center of the above pressure-reducible cooker, a vertically extending spindle is provided, and 2 to 6 baskets having the plane figure of a semi-circle or fan and having a predetermined height are fixable and attachable around the spindle. Further, the above baskets are vertically movable along the above spindle and rotatable about the spindle. The above spindle and the above baskets are preferably formed of stainless steel.

For the frying, first, frozen masses of fermented soybeans are placed in the above baskets. The amount of the frozen masses of fermented soybeans is preferably 50 to 90%, particularly preferably 60 to 80%, of the volume of each basket. When the above amount is less than 50%, the cooking efficiency is poor. When it exceeds 90%, the masses of fermented soybeans are not easily movable within each basket so that it is difficult to fry the fermented soybeans uniformly.

Then, the baskets with the frozen masses of fermented soybeans placed therein are attached to the above spindle. The baskets are attached to an upper portion of the spindle while a cover provided in an upper portion of the cooker is opened, and then moved down to a bottom portion of the pressure-reducible cooker before the introduction of a frying oil. Then, the cover is closed, and the pressure-reducible cooker is pressure-reduced inside. The pressure inside the pressure-reduced cooker is preferably approximately 5 to 40 Torr.

Then, a frying oil is introduced into the pressure-reduced cooker. The oil can be selected from any oils so long as they are edible, while it is particularly preferably an oil prepared from palm seeds. The amount of the oil to be introduced is 1.2 to 5 times, preferably 2 to 3 times, the amount (volume) of fermented soybeans to be fried. The oil is introduced in a hot state. The temperature of the oil to be introduced is preferably around 125° C. By the above introduction of the oil, the frozen masses of fermented soybeans are fried.

The above frying is carried out while circulating the heating oil and maintaining the temperature of the oil at 105 to 125° C. The frying time is preferably approximately 15 to 35 minutes, particularly preferably about 20 to about 25 minutes. When the temperature of the oil is lower than 105° C., or when the frying time is less than 15 minutes, the resultant dry food product of fermented soybeans cannot have an excellent flavor or an excellent feeling on the tongue. When the temperature of the oil exceeds 125° C., or when the frying time exceeds 35 minutes, the survival ratio of *Bacillus natto* sharply decreases or the dry food product of fermented soybeans is burned.

In the above frying, preferably, the baskets are jogged up and down and turned. Due to the above turning, etc., the oil is stirred, and the frozen masses of fermented soybeans are therefore uniformly fried. The above up and down jogging is preferably carried out at a rate of approximately 1 to 10 cm/second, particularly preferably at a rate of approximately 2 to 5 cm/second, and the above turning is carried out at a rate of approximately 0.5 to 10 rpm.

After the frying is finished, the baskets were elevated along the spindle up to an oil-free position in the pressure-reduced cooker. Then, the baskets are turned about the spindle at a high rate to remove oil by centrifugal separation. In this case, preferably, the baskets are turned preferably at 300 to 500 rpm, particularly preferably at 350 to 400 rpm. Further, preferably, the above separation of the oil is carried out for approximately 15 to 20 minutes. By the above separation of the oil, superfluous oil is separated and the resultant dry food of fermented soybeans is free of sticking nature when picked up with fingers, so that it can be easily had like cookies.

Then, the turning of the baskets is terminated, and the dry food product of fermented soybeans is cooled by cooling it together with the pressure-reduced cooker. The above cooling may be natural cooling or forced cooling. Then, vacuum is removed, followed by draining. Then, the cover of the pressure-reducible cooker is opened, and the baskets are taken out.

The above-fried fermented soybeans are finally subjected to a vibration sieve. By subjecting the fried fermented soybeans to a vibration sieve as above, skin portions of the fermented soybeans are peeled off from their seeds and sieved off, to collect the seeds alone, whereby the dry food product of fermented soybeans, provided by the present invention, is obtained.

In the above-prepared dry food product of fermented soybeans, the sticking nature and the odor of *Bacillus natto* and mucin as an essence are inhibited to some extent, and the dry food product is improved in flavor and sapidity. Further, it can be stored in a dry state for about half a year. When stored in a sealed state, it can be stored for 1 year or more.

Vitamins may be added to the above dry food produce of fermented soybeans, or they may be coated with various coating materials.

EXAMPLE

The present invention will be explained more in detail with reference to Example hereinafter.

Fermented soybeans obtained by a conventional process were placed in a container, and frozen at −25° C. for 24 hours. Frozen masses of fermented soybeans had the form of a plate, and each mass had a weight of 9.5 to 9.7 kg. Each mass had been pressed with a pattern frame from above to form a cross-cutting pattern for 15 divided pieces.

The above frozen masses of fermented soybeans were divided into 15 pieces each, and placed in baskets. The baskets had the form of a fan having a central angle of 90 degrees and had a height of 12 cm and an internal volume of 1,200 liters. A basketful of fermented soybeans corresponded to one frozen mass of fermented soybeans (9.5 to 9.7 kg).

Thereafter, four baskets were fixed around a spindle of a pressure-reducible cooker, and the pressure inside the cooker was reduced to 30 Torr. Then, a palm oil having a temperature of 125° C. was introduced into the pressure-reduced cooker, and the baskets with the frozen pieces of fermented soybeans in them were immersed in the oil, to fry the fermented soybeans. The temperature of the oil was decreased to 110° C. by the above immersion of the frozen fermented soybeans. The temperature of the oil was maintained at the above temperature during the frying. The time period for the frying was 25 minutes. During the frying, the baskets were jogged up and down at a rate of 3 cm/sec and turned about the spindle at a rate of 5 rpm.

After the frying was finished, the baskets were elevated, and turned at a rate of 350 rpm for 15 minutes to remove oil.

The turning of the baskets was terminated, and then the baskets with contents therein were allowed to cool. After the cooling was completed, the vacuum was removed, and the baskets were taken out of the pressure-reducible cooker.

The fried fermented soybeans from which the oil was removed were subjected to a sieve to separate skin portions from seeds portions, whereby a dry food product of fermented soybeans having seed portions alone, according to Example of the present invention, was obtained. While the corresponding frozen mass of fermented soybeans had a weight of 9.5 kg, the dry food product of fermented soybeans had a weight of about 3 kg.

10 Grams of the above-obtained dry food product of fermented soybeans was milled and measured for a *Bacilus natto* survival ratio by an agar plate culture method, to show $5.4 \times 10^8$ microorganisms/g. In this connection, the fermented soybeans in a raw state had a *Bacillus natto* survival ratio of $1.0 \times 10^9$ microorganisms/g.

100 Grams of the above-obtained dry food product of fermented soybeans was analyzed for various components, so show as shown in Table 1.

TABLE 1

|  | Example Dry food product of fermented soybeans | Fermented soybeans in raw state | Comparison with fermented soybeans in raw state (times) |
|---|---|---|---|
| <Components increased> | | | |
| Ash content | 4.8 g | 2.3 g | 2.1 |
| Calcium | 164 mg | 86.9 mg | 1.9 |
| Iron | 7.0 mg | 2.3 mg | 3.0 |
| Protein | 34.7 g | 16.4 g | 2.1 |
| Lipid | 24.4 g | 9.5 g | 2.6 |
| Sugar | 28.6 g | 10.6 g | 2.7 |
| Carbohydrate | 30.2 g | 12.6 g | 2.4 |
| Energy | 468 kcal | 197 kcal | 2.4 |
| <Components decreased> | | | |
| Water | 5.9 g | 59.2 g | 0.1 |
| Crude fiber | 1.6 g | 2.0 g | 0.8 |

Each weight per 100 g.

The above Table 1 also shows the data of fermented soybeans in a raw state.

The above dry food product of fermented soybeans was tested for a taste and feeling with a panel of 10 people who liked fermented soybeans and a panel of 10 people who did not like fermented soybeans. All the 10 panelists who liked fermented soybeans showed an opinion that the above dry food product was crisp and tasty. A half of the 10 panelists who did not like fermented soybeans showed an opinion that the above dry food product was tasty, and the remaining half had an opinion that the above dry food product was eatable anyhow.

This application is based on Japanese patent application No. 10-218566, the content of which is incorporated hereinto by reference.

What is claimed is:

1. A dry food product of fermented soybeans, which is prepared by frying fermented soybeans in an oil and removing skins, said dry food product having an average Bacillus natto survival ratio of $1.0 \times 10^8$ to $7.0 \times 10^8$ microorganisms/g when 10 g thereof is milled and measured by an agar plate culture method.

2. The dry food product of claim 1, wherein the dry food product has a water content of 2 to 7% by weight.

3. The dry food product of claim 1, wherein the dry food product has a lipid content of 20 to 32% by weight.

4. The dry food product of any one of claims 1 to 3, wherein the dry food product is obtained by freezing fermented soybeans at −5 to −30° C. before frying them, and then frying the fermented soybeans in a frozen state in an oil under a reduced pressure of 5 to 40 Torr at a temperature of 105 to 125° C. for 15 to 35 minutes.

* * * * *